Patented June 11, 1940

2,204,517

UNITED STATES PATENT OFFICE 2,204,517

LOW MOLECULAR WEIGHT METHACRYLIC ACID ESTER POLYMERS

Daniel E. Strain, Wilmington, Del., assignor to E. I. du Pont de Nemours & Company, Wilmington, Del., a corporation of Delaware No Drawing. Application August 21, 1937, Serial No. 160,269

1 Claim. (Cl. 260—32)

This invention relates to a process for obtaining low molecular weight polymers and primarily to low molecular weight polymeric esters of acrylic and methacrylic acids.

An object of the present invention is to provide a process for the preparation of low molecular weight esters of polymeric acrylic and methacrylic acid, which give solutions of low viscosity and high solids content. Another object of the invention is to provide a process wherein such monomeric compounds are polymerized in solution under suitable temperature, pressure and concentration conditions in order that a polymer having exceedingly low molecular weight is obtained. A further object of the invention is to provide a correlation of polymerization conditions in order to obtain an exceedingly low molecular weight polymer in solution, which has a viscosity and solids content such that it may be used directly as a coating composition for spraying or brushing. Other objects and advantages of the invention will hereinafter appear.

I have found that various factors influence the solution polymerization of the esters of methacrylic acid, among which are temperature of polymerization, concentration of catalyst used, concentration of monomer in the solvent in which polymerization is effected, and the nature of that solvent. These factors all influence the molecular weight of the polymeric product. The molecular weight of the polymer is substantially a direct measure of the viscosity of the resin in solution, i. e., for a given solids content the lower the molecular weight of the resin the lower will be the viscosity of the solution containing it. Considered from the basis of solids content of a solution for a given viscosity the lower the molecular weight of a resin the greater will be the solids content of the solution containing that resin. Hereinafter, primary reference will be made to molecular weight lowering, although it will be understood that the correlative effects of solids content and viscosity will be included. As a result of my investigations I have found that esters of acrylic and methacrylic acid can be polymerized to resins having exceptionally low molecular weights and consequently these resins can be dissolved in large amounts in many organic solvents to give low viscosity solutions, if the factors above referred to are controlled within certain limits.

When polymerizations are conducted in solution to produce low molecular weight polymers, the higher the temperature of polymerization, the more rapid will be the polymerization and the lower the molecular weight of the polymer produced. Furthermore, the catalyst concentration likewise is a major factor in the preparation of low molecular weight polymers, for, at any given temperature, the molecular weight of the polymer varies inversely as the concentration of the catalyst.

Benzoyl peroxide, an extensively used polymerization catalyst for the esters of acrylic and methacrylic acid, is relatively inactive in the dark when used in polymerizations at low temperatures. However, at temperatures in excess of 70° C. and, more especially, in excess of 80° C., the effectiveness of a catalyst such as benzoyl peroxide in increasing the rate of polymerization and, concurrently, the production of polymeric esters of low molecular weight becomes increasingly evident.

The effects of temperature and benzoyl peroxide concentrations are illustrated by the data in Tables I and II. Reductions in molecular weight, as the result of increased temperature, are apparent from the vertical columns, and reductions, due to increased benzoyl peroxide concentration (catalyst concentration is expressed in weight per cent, based on monomer) from the horizontal columns in Table I. The data from which these tables were constructed were gathered from work involving solutions comprising 450 parts by volume of methanol, 450 parts by volume of water and 100 parts by volume of methyl methacrylate, which were heated at the indicated temperature throughout the period for polymerization. This combination of solvents does not dissolve the polymer; but indicates the effectiveness of temperature and catalyst concentration in lowering the molecular weight of the polymerized resin.

TABLE I

Effect of temperature and catalyst concentration on the molecular weight of methyl methacrylate polymerized in 50 volume percent methanol-water

[Molecular weight (in thousands)]

| Temperature (° C.) | 0.0% catalyst | 0.1% catalyst | 0.5% catalyst | 1.0% catalyst |
|---|---|---|---|---|
| 65 | 166 | 140 | 130 | 112 |
| 80 | 112 | 106 | 78 | 72 |
| 100 | 110 | 94 | 74 | 64 |

The above information could be amplified by similar experiments carried out in other liquids and also in solvents for both monomer and polymer, but the trend is the same in all cases.

Relative molecular weights were calculated from the viscosity of polymer solutions in dioxan (5 grams resin in 100 grams of solution) by application of Fikentscher's and Staudinger's equations as illustrated in Table II.

TABLE II

*Viscosity and molecular weight of methyl methacrylate polymer*

| Viscosity (poises) 5 g./100 cc. in dioxan | Relative viscosity | k | Intrinsic viscosity | Molecular weight (Staudinger's equation) |
|---|---|---|---|---|
| 0.117 | 10 | 0.052 | 0.594 | 31,600 |
| 1.17 | 100 | 0.083 | 1.38 | 74,000 |
| 11.7 | 1,000 | 0.109 | 2.30 | 124,000 |
| 117.0 | 10,000 | 0.133 | 3.38 | 182,000 |

Column 1 gives the viscosity in poises (25° C.) of dioxan solutions containing 5 grams of resin per 100 cc. of solution. Column 2 gives the ratio of the viscosity of the solution to the viscosity of the solvent taken as 0.0117 poise. Column 3 is Fikentscher's viscosity constant as calculated from the equation $$\log n_r = \frac{75k^2c}{1+1.5kc} + kc$$

where $n_r$ is the relative viscosity and $c$ is the concentration. Column 4 gives the estimated intrinsic viscosity for very dilute solutions, the extrapolation being made with Fikentscher's equation $$\frac{n_r - 1}{c} = 2.30(75k^2 + k)$$

(In H. Fikentscher, Cellulosechemie, 13, 58–74 (1932).) Column 5 gives the molecular weights as calculated from the intrinsic viscosity by Staudinger's method using the constants given by Staudinger in a paper on polyacrylic esters. (In H. Staudinger, Ann., 502, 201 (1933).) Molecular weights thus obtained are roughly 64% as great as those obtained by the application of Staudinger's equation using viscosities determined at concentrations involving only 0.02 to 0.06 gram of polymer per 100 cc. of solution. Molecular weights from the more dilute solutions probably more nearly approach the true values. However, due to the assumptions involved, any molecular weights based on viscosity measurements are relative in nature and of use only for comparison with values determined in the same manner.

I have also found that when the concentration of the monomer is varied in a given solvent the molecular weight of the polymer varies directly with the monomer concentration. In a group of catalyst-free polymerizations carried out at 70° C. in a 50 volume per cent methanol-water mixture, data were obtained as given in Table III.

TABLE III

*Concentration effect—methyl methacrylate polymerized in methanol-water solution*

| Percent monomer | Molecular weight (in thousands) |
|---|---|
| 5 | 100 |
| 10 | 140 |
| 20 | 168 |

The same effect is observed when 95% ethanol is used as the solvent in 65° C. catalyst-free polymerizations (Table IV).

TABLE IV

*Concentration effect—methyl methacrylate polymerized in 95% ethanol*

| Percent monomer | Molecular weight (in thousands) |
|---|---|
| 20 | 75 |
| 30 | 77 |
| 50 | 90 |

The concentration effect is also observed in polymerizations using benzoyl peroxide in 95% ethanol at 65° C., (Table V).

TABLE V

*Concentration effect—methyl methacrylate polymerized in 95% ethanol using 0.1% catalyst (based on the monomer)*

| Percent monomer | Molecular weight (in thousands) |
|---|---|
| 10 | 35 |
| 20 | 36 |
| 30 | 43 |

The data of Tables III, IV, V illustrate conclusively that the concentration of the monomer in solution determines to no small extent the molecular weight of the polymeric resin obtained.

In addition to the above conditions I have found that various solvents differ considerably in their influence on the molecular weights of polymers produced in them. Table VI gives data on the molecular weights obtained when 20% solutions of methyl methacrylate were polymerized in a number of solvents at 65° C. in the absence of polymerization catalysts. The table likewise shows that as polymerization proceeds the molecular weight of polymer formed continuously decreases as the yield of polymer increases.

TABLE VI

*Polymerization data for 20% methyl methacrylate solutions in various solvents*

| Solvent | Yield at the hours | | | | | Mol. wt./1000 at the hours | | | |
|---|---|---|---|---|---|---|---|---|---|
| | 24 | 47 | 72 | 118 | 225 | 24 | 47 | 118 | 225 |
| Acetone | 0 | 42 | | | 73 | | 78.5 | | 75 |
| Dioxan | 69 | 84 | 88 | 98 | 98 | 40 | 37 | | 35 |
| Ethylene chloride | 0 | 16 | 25 | 42 | 63 | | 75 | | 54 |
| Butyl acetate | 0 | 0 | 40 | 69 | 86 | | | | 41 |
| Methoxyethanol | 56 | 81 | 87 | 97 | 97 | 50 | 48 | | 46 |
| Methylene chloride | | | | 57 | | | | 78 | |
| Ethyl acetate | | | | 70 | | | | 58 | |
| 95% Ethanol | | | | | 75 | | | | 75 |
| 50% Methanol | } | 96 | | | | | 166 | | |
| 50% Water | | | | | | | | | |
| Benzene | | 21 | | | | | 95 | | |

The above considerations indicate the effectiveness of the temperature of polymerization, the concentration of catalyst, concentration of monomer in the solution, wherein polymerization is to be effected, and the type of solvent used. Individually, each of these conditions has a decided effect on the lowering of the molecular weight of the esters of acrylic and methacrylic acid; combined, they have the ability of producing polymeric resins of such low molecular weight that they can be dissolved in solvents to give a solids content of resin ranging from 30 to 60% by weight with viscosities ranging from 0.2 to 2 poises at 25° C. Polymeric methyl methacrylate, for example, may be prepared in accord with my invention to give a solution containing from 30 to 45% of the polymer with a viscosity ranging from 0.2 to 2.0 poises at 25° C. This makes it possible to utilize these esters for applications in the lacquer industry, wherein it is absolutely necessary for commercial exploitation that the solids content of a lacquer be sufficiently high to obtain good covering and adequate protection by the minimum number of lacquer coatings, and the viscosity be such that the solution may be easily applied by dipping, brushing or spraying.

Coating compositions are extensively applied by spraying and I have found that polymeric esters of acrylic and methacrylic acids, especially methyl methacrylate, of high molecular weight, even though dissolved to give a solution of spraying viscosity, will cobweb, i. e., threads will form between the spray gun and the work with the result that a rough, unacceptable coating, except for special purposes, is obtained. With low molecular weight polymers the "cobwebbing" is eliminated and with resins having a viscosity between 0.3–0.7 poise at 25° C. excellent coatings can be applied. For desirable brushing viscosities those ranging between 1.5 to 2.0 poises at 25° C. are preferred. Solutions having a solids content of 30 to 60% of resin give excellent brushing and spreading characteristics.

To obtain the lowest possible molecular weight polymers it is necessary, I have found, to carry out the polymerization at temperatures in excess of 75° C. and, preferably, between 90 and 100° C. for methyl methacrylate and similar low-boiling monomeric esters and derivatives of acrylic and methacrylic acids such as methyl methacrylate, ethyl methacrylate, methyl acrylate, ethyl acrylate, butyl acrylate and the nitriles of acrylic and methacrylic acids. Temperatures well in excess of 100° C., however, may be employed especially when monomeric esters, e. g., propyl methacrylate, butyl methacrylate, isobutyl methacrylate and the higher alcohol esters of methacrylic acid, are polymerized and particularly those which have boiling points above 100° C. The catalyst concentration should be at least 0.1%, based on the weight of monomer and, preferably, from 0.5 to 2% or higher, it being understood that the catalyst has essentially the equivalent activity of benzoyl peroxide, i. e., a given weight of catalyst will affect the molecular weight during polymerization to the same extent as the same weight of benzoyl peroxide. In the event that the catalyst used has a lower activity considered by this measure, proportionately larger quantities thereof should be employed and, contrariwise, if the catalyst has a greater activity, proportionately smaller amounts will give substantially the same results.

As has been indicated the type of solvent used is of considerable importance, and I have found that substantially anhydrous organic solvents which are solvents for both monomer and polymer are most suitable. Solvents which are well adapted for this purpose include: the ketones, such as acetone, cyclohexanone, and diisopropyl ketone (the latter being suitable for polymerizing the esters excepting methyl methacrylate); ethylene glycol monoethyl ether; the esters generally, e. g., methyl formate, ethyl acetate, isobutyl propionate, cyclohexyl acetate; the alkyl and aryl halides, e. g., methylene chloride, chloroform, ethylene dichloride, chlorobenzene; dioxan; benzene and toluene and for polymerizing butyl and isobutyl methacrylates, solvent naphtha. Table VI shows the effect of large amounts of water which prevent the preparation of desirable molecular weight lowering.

The effectiveness of my process will be appreciated by the following examples in which parts are given by weight unless otherwise stated. There are, of course, many forms of the invention other than these specific embodiments.

*Example I.*—A solution containing 600 parts by weight of methyl methacrylate monomer, 1400 parts by weight of toluene and 12 parts by weight of benzoyl peroxide was placed in a flask fitted with a reflux condenser and heated for 7 hours on a boiling water bath. A very fluid solution of the polymeric ester containing 30% solids in toluene was obtained having a viscosity of 0.25 poise at 25° C.

This solution was suitable directly as prepared for coating or impregnating purposes by spraying, brushing or dipping. Films from it on baking to a solvent-free state are exceedingly hard, tough and have a good adhesion. According to solids determination the polymerization was essentially complete. The molecular weight of the polymer was found to be approximately 30,000. The solid polymer, after separation from the toluene, was found to be soluble in acetone, cyclohexanone, ethylene glycol monoethyl ether, methyl formate, ethyl acetate, butyl lactate, isobutyl propionate, cyclohexyl acetate, chloroform, methylene chloride, ethylene dichloride, chlorobenzene, dioxan, benzene, toluene, acetic acid, formic acid and isobutyric acid, and because of the low molecular weight of the polymer it is possible to get several times as much in solution at a workable viscosity than is possible with high molecular weight polymer.

*Example II.*—A solution containing 20 parts by weight of propyl methacrylate, 80 parts by weight of toluene, 0.4 part by weight of benzoyl peroxide were placed in a flask provided with a reflux condenser and heated for 6 hours at a temperature of approximately 92° C. At the end of this time the yield of polymer was substantially 95% and a 15% solution of this polymeric resin in toluene gave a viscosity of approximately 0.03 poise.

The low molecular weight polymers obtained in accord with my invention are particularly well adapted for use in the preparation of lacquer compositions. It will be appreciated that for such compositions a resin should be highly soluble in the vehicle employed, and when my low molecular weight resins are used, they may be dissolved to give high solids content lacquers. I have found that films formed from lacquers containing the exceedingly low molecular weight polymers, say, 40,000 or lower, can be increased in toughness in order to give exceedingly tough and durable films by adding to the lacquer composition a plasticizing agent such, for example, as dibutyl phthalate, dicyclohexyl phthalate and dibutoxyhexyl phthalate, upon which a product will be obtained having exceptional and unusual protective powers. Various resinous and resin-like materials may also be used to modify the flexibility, toughness and hardness of films from these low molecular weight polymers, such, for example, as rosin, ester gum, phenol aldehyde resin, cellulose nitrate, vinyl chloride-vinyl acetate interpolymers, chlorinated rubber, chlorinated diphenyl resin, toluene sulfonamide-aldehyde resin, cumarone-indene resins, and asphalt.

My process is particularly adapted for low molecular weight polymers from the following monomeric compounds: the acid, nitrile, and esters of acrylic acid and, more particularly, the methyl, ethyl, propyl, butyl, isobutyl, octyl, tertiary amino ethyl, tertiary amino methyl, and higher acrylates are all subject to my improved process. Resins of low molecular weight may likewise be obtained from the acid, nitrile and esters of methacrylic acid and, more particularly, methyl, ethyl, n-propyl, n-butyl, isobutyl, octyl, tertiary amino methyl, tertiary amino ethyl, cetyl, and the higher alkyl methacrylates. Moreover, mixtures of monomeric compounds may be similarly treated, e. g., mixtures of dissimilar esters of acrylic acid, or esters of methacrylic acid; esters of acrylic acid with esters of methacrylic acids; esters of acrylic acid or esters of methacrylic acid with vinyl chloride, vinyl acetate or other polymerizable compounds which form interpolymers.

From a consideration of the above specification, it will be realized that many changes may be made in the details therein given without sacrificing any of the advantages derived therefrom or departing from the scope of the invention.

I claim:

A process of preparing a low molecular weight polymer of a butyl methacrylate which comprises polymerizing the ester in solvent naphtha, at a temperature in excess of 100° C. and with a catalyst concentration of from 0.5 to 2.0% benzoyl peroxide, based on the weight of monomeric compound present, the solution prior to polymerization containing less than 30% monomer, the polymerization being continued until a polymer is obtained which will dissolve in toluene to give a liquid having a solids content of from 30–60% and a viscosity of from 0.2 to 2.0 poises at 25° C.

DANIEL E. STRAIN.